United States Patent
Drolet

(10) Patent No.: US 8,970,808 B2
(45) Date of Patent: Mar. 3, 2015

(54) DISPLAY WITH TEMPERATURE SENSORS

(75) Inventor: Jean-Jacques Drolet, San Jose, CA (US)

(73) Assignee: Apple Inc., Cupertino, CA (US)

( * ) Notice: Subject to any disclaimer, the term of this patent is extended or adjusted under 35 U.S.C. 154(b) by 123 days.

(21) Appl. No.: 13/609,773

(22) Filed: Sep. 11, 2012

(65) Prior Publication Data

US 2014/0071383 A1 Mar. 13, 2014

(51) Int. Cl.
*G02F 1/133* (2006.01)
*G02F 1/1333* (2006.01)
*G02F 1/1345* (2006.01)
*G09G 3/36* (2006.01)

(52) U.S. Cl.
CPC .............. *G02F 1/13306* (2013.01); *G09G 3/36* (2013.01); *G09G 2320/041* (2013.01)
USPC ................................. 349/72; 349/58; 349/150

(58) Field of Classification Search
CPC ........... G09G 2320/041; G09G 3/3406; G02F 1/133382
USPC ............................................. 349/58, 72, 150
See application file for complete search history.

(56) References Cited

U.S. PATENT DOCUMENTS

| | | | |
|---|---|---|---|
| 6,115,091 A * | 9/2000 | Kondoh et al. | 349/72 |
| 6,774,883 B1 * | 8/2004 | Muhlemann | 345/101 |
| 7,420,538 B2 | 9/2008 | Murao et al. | |
| 7,554,627 B2 * | 6/2009 | You et al. | 349/72 |
| 8,102,486 B2 | 1/2012 | Yamato et al. | |
| 8,188,965 B2 | 5/2012 | Yang | |
| 2006/0221047 A1 | 10/2006 | Tanizoe et al. | |
| 2008/0158481 A1 * | 7/2008 | Lee et al. | 349/72 |
| 2010/0277519 A1 | 11/2010 | Lee | |
| 2011/0069092 A1 * | 3/2011 | Furukawa et al. | 345/690 |
| 2011/0164195 A1 * | 7/2011 | Chang et al. | 349/42 |
| 2011/0209554 A1 * | 9/2011 | Miyashita | 73/724 |

* cited by examiner

*Primary Examiner* — Nathanael R Briggs

(74) *Attorney, Agent, or Firm* — Treyz Law Group; G. Victor Treyz; Jason Tsai

(57) ABSTRACT

A display may be provided with display layers such as a thin-film-transistor layer and a color filter layer. Liquid crystal material may be interposed between the thin-film-transistor layer and the color filter layer. Due to temperature fluctuations during operation, the optical properties of the liquid crystal material may be altered. To prevent color casts from developing in the display, the display may include temperature sensors. The temperature sensors may run along the left and right edges of the thin-film-transistor layer or may be mounted to other portions of the display. A signal bus may be used to gather temperature sensor data from the temperature sensors. Control circuitry may use temperature data from the temperature sensors to make display color cast adjustments that compensate for temperature fluctuations in different regions of the display.

21 Claims, 15 Drawing Sheets

DISPLAY WITH TEMPERATURE SENSORS

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

It can be challenging to incorporate a display into the housing of an electronic device. Size and weight are often important considerations in designing electronic devices. Often when components are installed in close proximity to one another in an effort to minimize system size, components may become hot during use.

During operation of displays such as liquid crystal displays, temperature changes in liquid crystal material can lead to changes in the optical properties of the liquid crystal material. These changes can cause color casts if not corrected. For example, as a result of a decrease in the birefringence of the liquid crystal material with increasing temperature, liquid crystal displays typically become bluer as temperatures rise.

To address temperature-dependent color changes in liquid crystal displays, a temperature sensor is sometimes mounted to the back of a display. The temperature sensor may be used to estimate the temperature of the display in real time. The control circuitry for the display may then pre-distort video information loaded into the display with a color shift that compensates for the estimated temperature-induced color shift.

This type of approach may be unsatisfactory for displays that are characterized by non-uniform temperature profiles across the surface of the display. If the locations of hot system components and cooling system patterns cause temperature variations across the display, the temperature sensor on the back of the display will not be able to accurately estimate display temperature.

It would therefore be desirable to be able to provide improved temperature sensing for displays in electronic devices.

SUMMARY

An electronic device may be provided with a display. The display may be provided with display layers such as a thin-film-transistor layer and a color filter layer. Liquid crystal material may be interposed between the thin-film-transistor layer and the color filter layer. Due to temperature fluctuations during operation, the optical properties of the liquid crystal material may be altered. To prevent color casts from developing in the display due to changes in the optical properties of the liquid crystal material, the display may incorporate temperature sensors.

The temperature sensors may run along the left and right edges of the thin-film-transistor layer or may be mounted to other portions of the display. Temperature readings may be taken from the temperature sensors to determine the temperatures of different regions of the display.

The temperature sensors may be implemented as circuits on the surface of a display layer substrate, as discrete devices, or as portions of integrated circuits. Control circuitry may use temperature data from the temperature sensors to make display color cast adjustments that compensate for temperature fluctuations.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
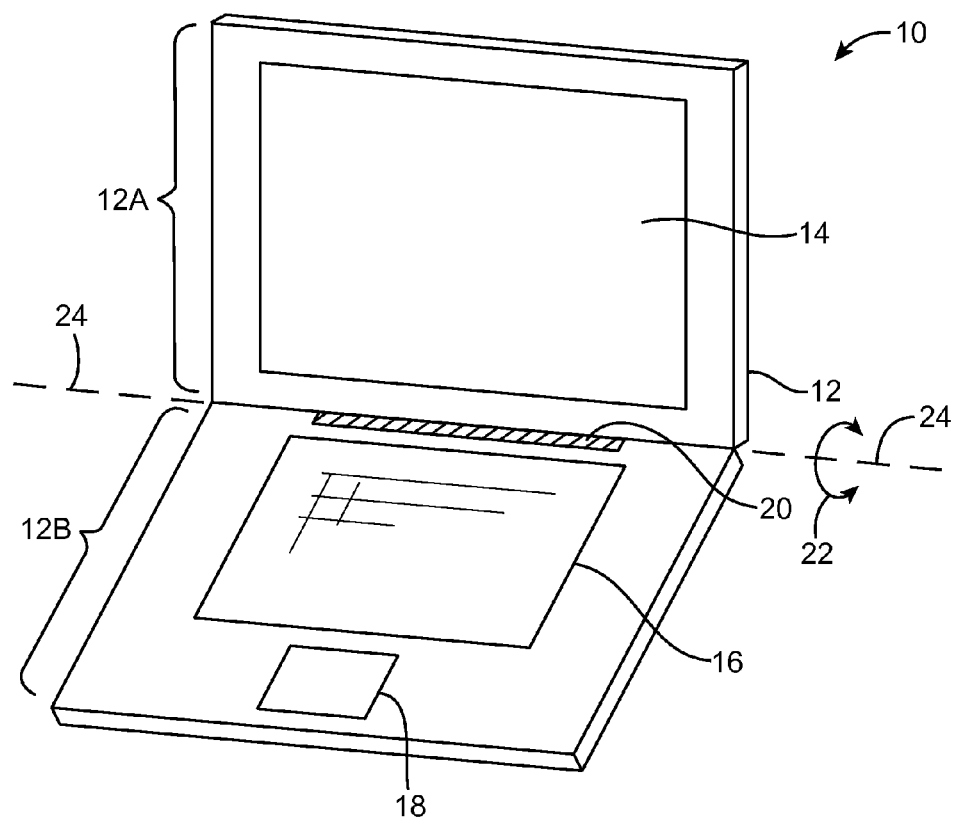
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes be referred to as a display housing or lid, may be placed in a closed position by rotating upper housing 12A towards lower housing 12B about rotational axis 24.

Figure 2:
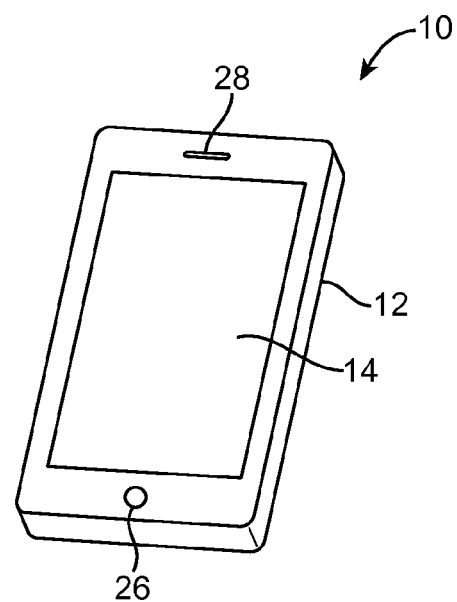
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
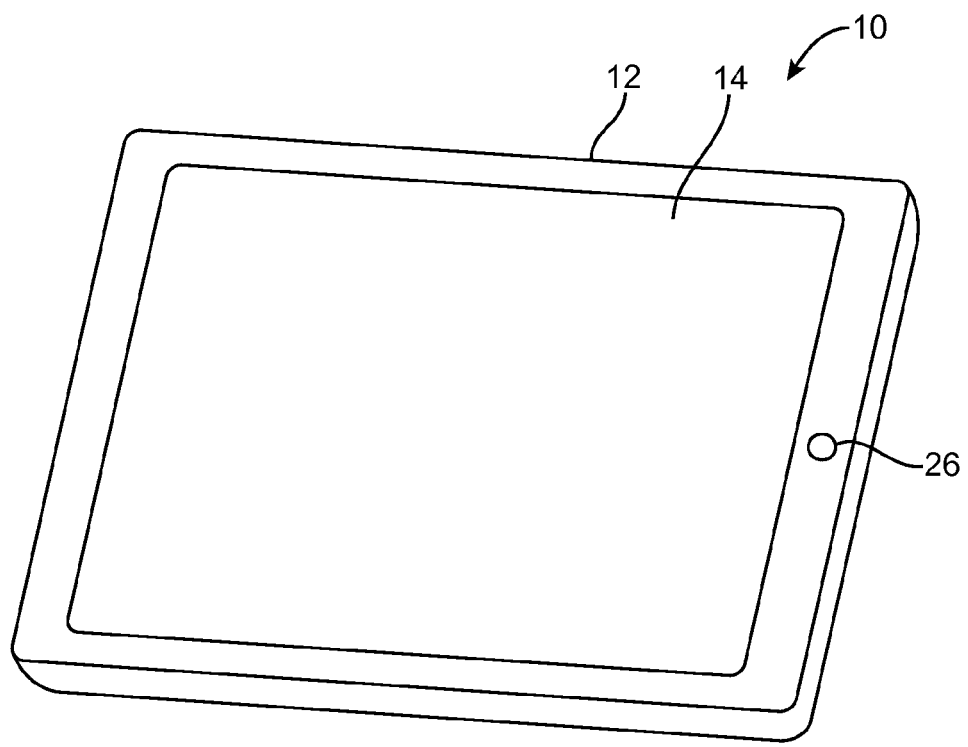
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. Other types of display technology may be used in device 10 if desired.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
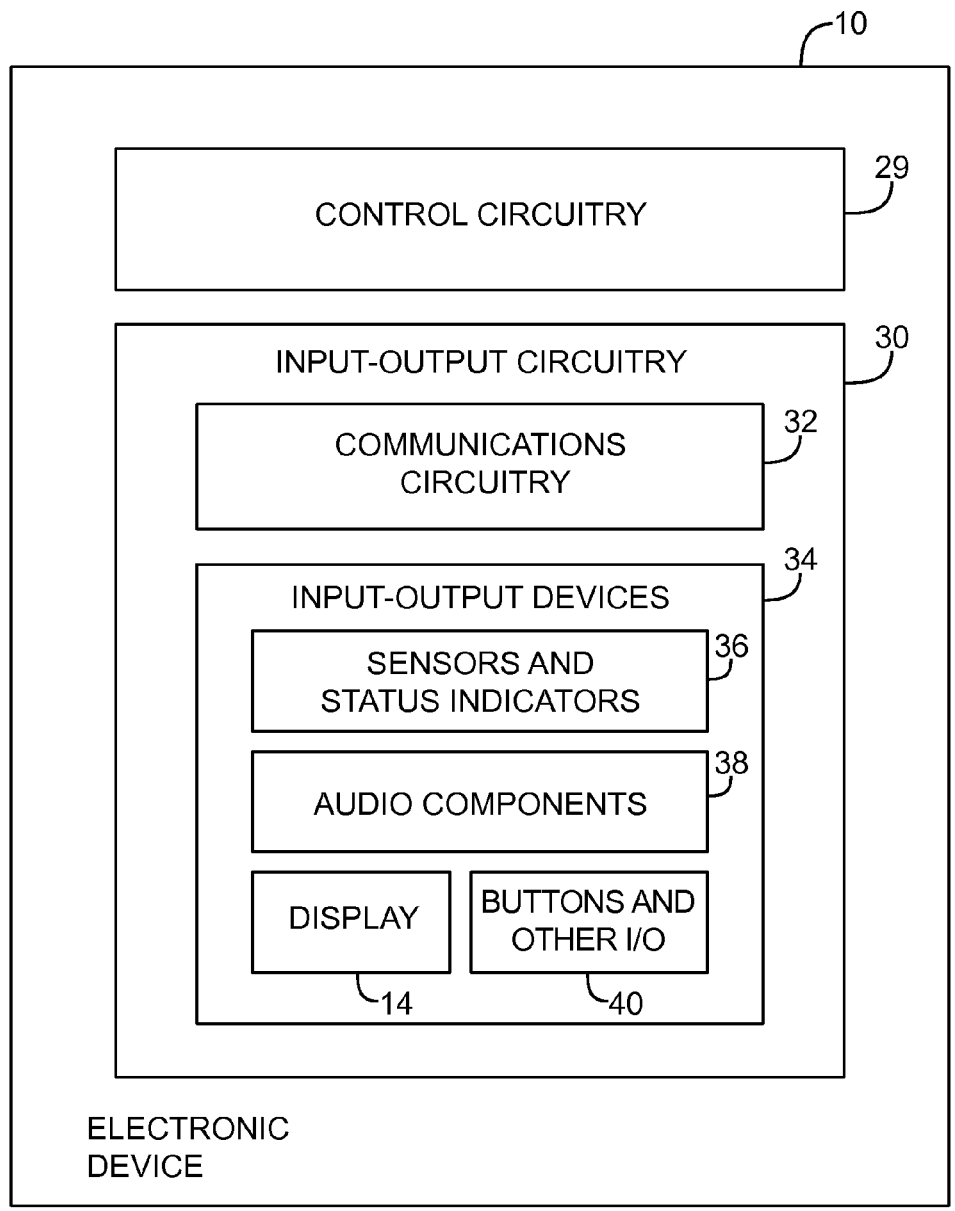
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14 and the color cast associated with image data in various portions of display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
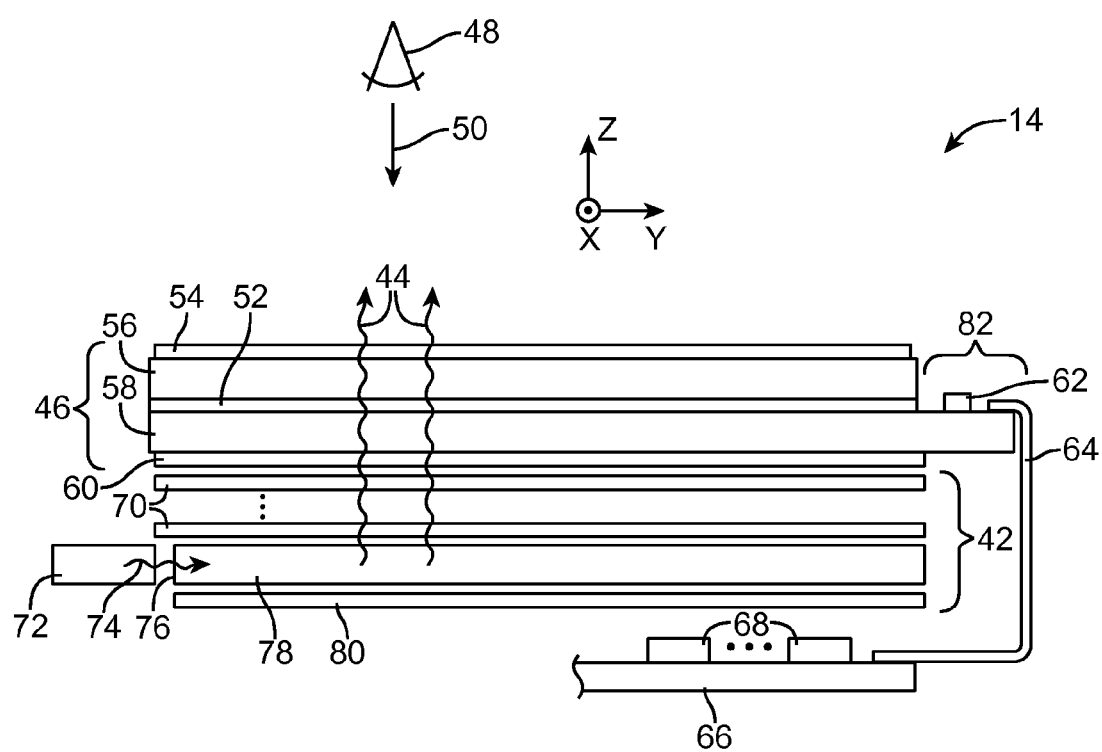
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates. Layers 58 and 56 may have rectangular peripheries each having upper and lower edges and left and right edges.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 5) may be used to generate information to be displayed on display (e.g., display data). The information to be displayed may be conveyed from circuitry 68 to display control circuits such as display driver integrated circuit 62 using a signal path such as a signal path formed from conductive metal traces in flexible printed circuit 64 (as an example).

Control circuitry for controlling display 14 may, in general, be formed on a substrate such as substrate 58, may be formed using an integrated circuit that is mounted on a substrate such as substrate 58, or may be formed elsewhere in device 10 (e.g., on a flexible printed circuit such as flexible printed circuit 64, a printed circuit such as printed circuit 66, or other substrate). As an example, circuitry such as gate driver circuitry for display 14 may be formed using thin-film transistors on substrate 58 (e.g., amorphous thin-film transistors or polysilicon thin-film transistors). As another example, an integrated circuit may be mounted on the surface of substrate 58 in a "chip-on-glass" arrangement. Display circuitry may also be formed on substrates that are electrically coupled to substrate 58.

In the example of FIG. 5, display driver integrated circuit 62 has been mounted on thin-film-transistor layer driver ledge 82. This is merely illustrative. Display control circuits such as gate driver circuits (sometimes referred to as row line driver circuits), data line driver circuits (sometimes referred to as source line drivers, column line driver circuits, or display driver chips) or elsewhere in device 10.

As shown in FIG. 5, a flexible printed circuit cable such as flexible printed circuit 64 may be used in routing signals between printed circuit 66 and thin-film-transistor layer 58. If desired, display driver integrated circuit 62 may be mounted on printed circuit 66 or flexible printed circuit 64. Printed circuit 66 may be formed from a rigid printed circuit board (e.g., a layer of fiberglass-filled epoxy) or a flexible printed circuit (e.g., a flexible sheet of polyimide or other flexible polymer layer).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Figure 6:
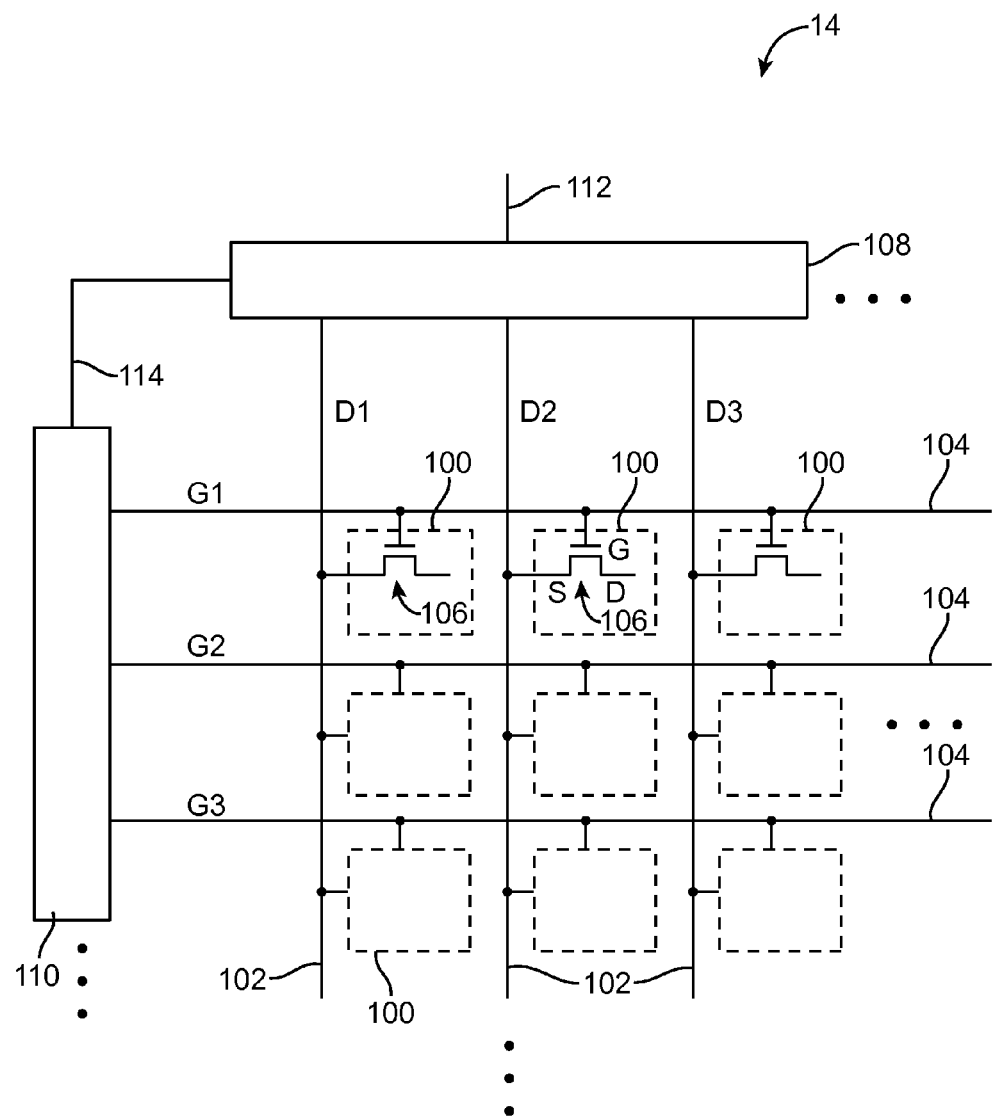
FIG. 6 is a diagram of an illustrative display showing how an array of display pixels in the display may be provided with control signals using control circuitry coupled to data lines and gate lines in accordance with an embodiment of the present invention.

FIG. 6 is a circuit diagram of an illustrative display such as display 14 showing how display 14 may include an array of display pixels such as display pixels 100. Display pixels 100 may be organized in rows and columns. Display control circuitry such as circuitry 108 and 110 may be used to supply control signals to display 14 over signal lines such as lines 102 and 104. Display pixels 100 may contain electrodes for applying electric fields to associated portions of liquid crystal layer 52 (FIG. 5). Transistor circuitry such as thin-film transistors formed from amorphous or polycrystalline silicon may be included in display pixels 100. As shown in FIG. 6, for example, each display pixel may include a thin-film transistor such as thin-film transistor 106. The source S of each transistor 106 may be coupled to a respective one of lines 102, so lines 102 are sometimes referred to as source lines. Lines 102 may also sometimes be referred to as column lines or data lines.

During operation of display 14, circuitry 108 may be used to supply display data signals (D1, D2, D3 . . . ) to the array of display pixels 100 via data lines 102. Circuitry 108 may therefore sometimes be referred to as display driver circuitry, data line driver circuitry, column driver circuitry, or source driver circuitry (as examples). Circuitry 108 may receive data to be displayed via path 112. For example, circuitry 108 may be implemented in the form of an integrated circuit that is mounted on a flexible printed circuit, other printed circuit substrates, or a portion of a display substrate such as a thin-film-transistor substrate. Path 112 may be formed from a flexible printed circuit bus or other bus and may be used to couple circuitry 108 to processor circuitry and other control circuitry in device 10.

Control circuitry 108 may provide clock signals and control signals to circuitry 110 over paths such as path 114. Circuitry 110 may include circuitry that selectively asserts control signals on lines 104. The control signals on lines 104 may sometimes be referred to as row control signals. These control signals may also sometimes be referred to as gate signals (G1, G2, G3, . . . ), because they are applied to the gates G of thin-film transistors 106 in display pixels 100. Circuitry 110, which may sometimes be referred to as gate driver circuitry or row driver circuitry, may contain a linked chain of circuits that assert gate line signals on lines 104 in sequence (e.g., first asserting G1, then asserting G2, then asserting G3, and so forth).

Although shown along the left-hand edge of display 14 in the example of FIG. 6, circuitry 110 may be formed along the right-hand edge of display 14 or along both the right and left edges of display 14, if desired. Gate driver circuitry 110 may be implemented using thin-film transistors on a display substrate such as substrate 58, may be implemented as part of circuitry 108 (e.g., when circuitry 108 is formed using an integrated circuit), or may be formed using one or more separate integrated circuits. As an example, there may be one or more integrated circuits 108 arranged alone the upper edge of display 14 and one or more integrated circuits 110 arranged along the left and right edges of display 14. These integrated circuits 108 may be mounted on thin-film-transistor substrate 58 (using chip-on-glass technology) or may be mounted on ancillary substrates such as flexible printed circuit substrates having traces that are electrically coupled to corresponding traces on thin-film-transistor substrate 58 (e.g., using anisotropic conductive film or other conductive adhesive to form trace-to-trace connections, using solder connections, using welds, using connectors, etc.).

Figure 7:
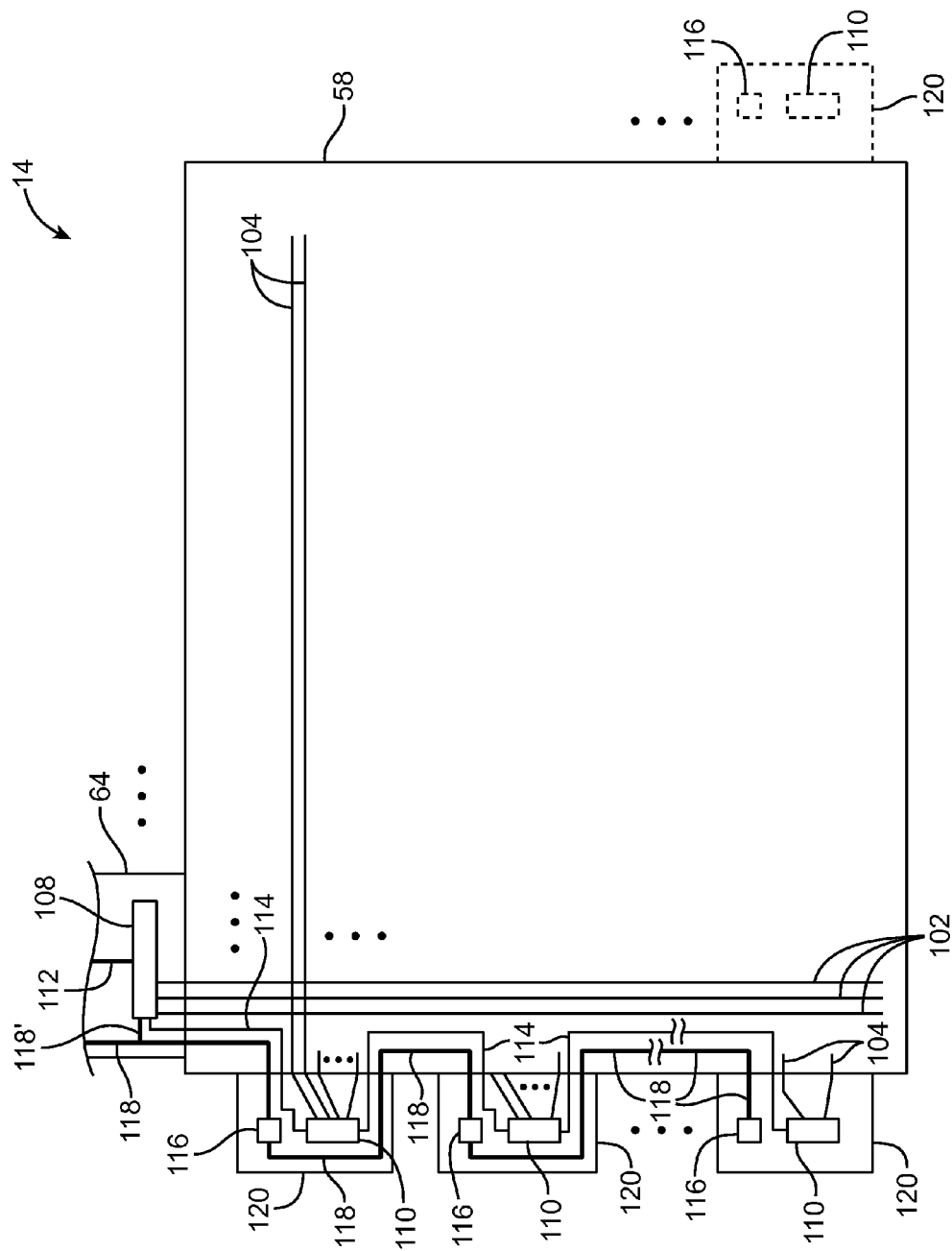
FIG. 7 is a top view of an illustrative thin-film-transistor layer to which flexible printed circuits with temperature sensors and gate driver integrated circuits have been mounted in accordance with an embodiment of the present invention.

FIG. 7 is a top view of an illustrative configuration of the type that may be used for display 14. As shown in FIG. 7, gate lines 104 may run horizontally across the width of thin-film-transistor substrate 58 and data lines 102 may run vertically across thin-film-transistor substrate 58. Display pixels 100 (FIG. 6) may be controlled by data signals on lines 102 and gate signals on lines 104. Data signals for lines 102 may be provided by one or more display control circuits such as data line driver circuits 108. Gate signals for lines 104 may be provided by one or more display control circuits such as gate line driver circuits 110.

Circuitry 108 may be mounted on a substrate such as substrate 64 (e.g., a flexible printed circuit or other suitable substrate). Circuitry 108 may be implemented using one or more integrated circuits running along the upper edge of substrate 58 or mounted elsewhere in display 14. Path 112 may be used to provide display data to circuitry 108. Circuitry 108 may produce corresponding data signals on lines 102 and clock signals and other control signals for circuitry 110 on path 114.

Circuitry 110 may be implemented as a series of discrete integrated circuits 110 (as an example). Each integrated circuit 110 may be mounted on a respective substrate 120. Substrates 120 may be, for example, flexible printed circuit substrates having metal traces that are coupled to respective metal traces on substrate 58 using anisotropic conductive film or other conductive adhesive, using solder, using welds, using connectors, etc. If desired, integrated circuits 110 may be mounted on substrate 58 using a chip-on-glass configuration or the circuitry of integrated circuits 110 may be formed as part of a thin-film-transistor circuit on substrate 58. The configuration of FIG. 7 in which individual gate driver integrated circuits 110 are mounted on respective flexible printed circuit substrates 120 that are coupled along the left and/or right edges of display 14 is merely illustrative.

As shown in FIG. 7, path 114 may include multiple segments. A first segment 114 may be coupled between circuitry 108 and a first integrated circuit 110 that is coupled to the upper left of display substrate 58. A second segment 114 may be coupled between the first integrated circuit 110 and a second integrated circuit 110, which is located adjacent to circuit 110 on the left edge of display substrate 58. Additional segments 114 may be used to couple successive integrated circuits 110 to each other to form a chain of gate driver circuits 110 of the left edge of the display. Circuits 110 may be coupled similarly on the right edge of the display. During operation, path 114 may be used to share control signals such as clock data signals that help circuits 110 stay synchronized with each other as they successively assert gate signals on gate lines 104. Paths such as path 114 may include metal traces on substrate 64, metal traces on substrate 58, and metal traces on each of substrates 120.

To accurately monitor the temperature of display 14, particularly in configurations for display 14 in which different portions of substrate 58 may exhibit different operating temperatures, it may be desirable to provide display 14 with temperature sensing capabilities. As an example, temperature sensing circuitry 116 may be provided on substrates 120 or elsewhere in display 14 to monitor temperatures. Temperature sensing circuitry for display 14 may, in general, be implemented using thin-film-transistor circuitry on a substrate such as display substrate 58 (e.g., along one or more, two or more, or three or four of the peripheral edges of substrate 58) or substrates 120 or 64, may be implemented using integrated circuits (e.g., integrated circuits mounted on substrates 58, 120, 64, and/or other substrates), or may be implemented using discrete temperature sensing components (e.g., discrete surface mount technology temperature sensors mounted on substrates 58, 120, 64, and/or other substrates). The configuration of FIG. 7 in which temperature sensors 116 are shown as being implemented as circuits (e.g., integrated circuits) mounted on respective substrates 120 along the edges of substrate 58 is merely illustrative.

Signals associated with the operation of temperature sensor circuitry 116 may be routed to and from circuitry 116 using paths that are coupled between circuitry 108 and circuitry 116, using paths that are coupled between circuitry 110 and circuitry 116, using paths that are coupled between control circuitry 29 (FIG. 4) and circuitry 116 (e.g., integrated circuits 68 of FIG. 5), and using other paths to couple circuitry 116 to circuitry for processing and using temperature signal measurements from circuitry 116.

As shown in the illustrative example of FIG. 7, temperature sensor integrated circuits 116 may be formed on each of substrates 120 along the left and right edges of thin-film-transistor substrate 58. A path such as path 118 of FIG. 7 that includes metal traces on printed circuit substrates 120 and that includes metal traces on substrate 58 may be used to link successive temperature sensors 116. Path 118 may serve as a signal bus and may have respective segments that link respective temperature sensors. Some of path 118 may, if desired, be formed on substrate 64 (e.g., to couple temperature sensor circuits 116 to control circuitry 29 such as integrated circuits 68 of FIG. 5). Portions of path 118 such as path segment 118' may also be used to couple temperature sensor communications path 118 to circuitry 108. If desired, circuitry 110 may include circuitry for communicating with temperature sensors 116. In this type of configuration, communications paths such as branches of path 118 may be used to couple circuits 110 to associated adjacent temperature sensors 116.

Figure 8:
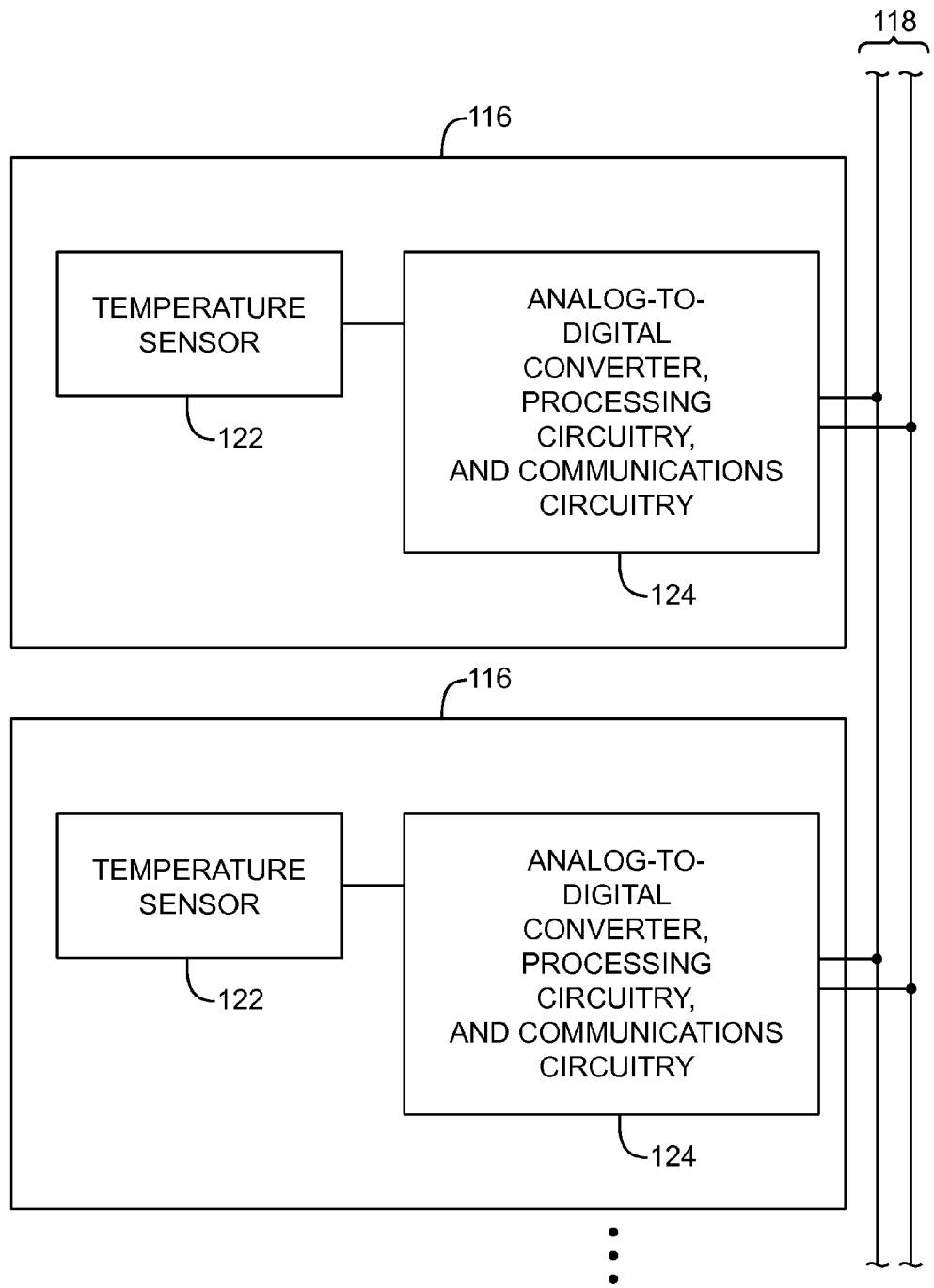
FIG. 8 is a circuit diagram of illustrative temperature sensor integrated circuits that are coupled to a bus in accordance with an embodiment of the present invention.

A circuit diagram of illustrative temperature sensor circuitry of the type that may be used in display 14 is shown in FIG. 8. In the example of FIG. 8, temperature sensors 122 are coupled to circuits 124. Each temperature sensor 122 may be based on a temperature sensing diode or other temperature sensor. The block of circuitry 124 that is coupled to each temperature sensor 122 may include analog-to-digital converter circuitry for converting analog temperature data from temperature sensor 122 into digital temperature data, processing circuitry for processing temperature data, and communications circuitry for handling communications with other circuits. For example, each circuitry block 124 may include circuitry for transmitting temperature data over bus 118. Bus 118 in the FIG. 8 example is a two-wire bus (e.g., an I²C bus) that is coupled to each of circuits 116. Each circuit 116 in FIG. 8 may be implemented using a separate integrated circuit. Each of these integrated circuits may be mounted on a respective printed circuit substrate 120 (FIG. 7) running along the edge of display 14.

Figure 9:
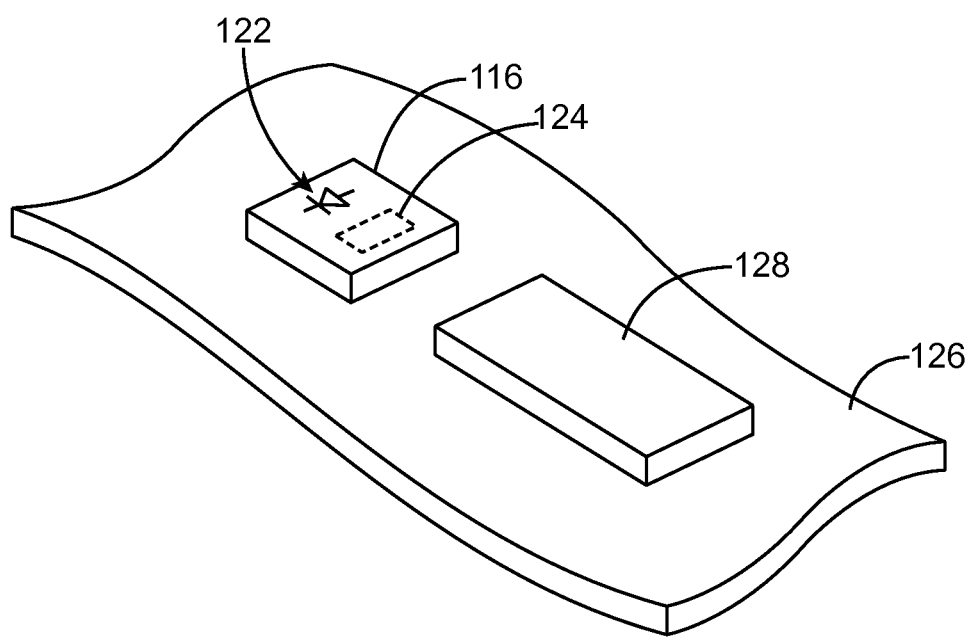
FIG. 9 is a perspective view of a display control integrated circuit such as a gate driver integrated circuit and a temperature sensor integrated circuit of the type that may be mounted adjacent to the gate driver integrated circuit in accordance with an embodiment of the present invention.

FIG. 9 is a perspective view of an illustrative temperature sensor configuration in which temperature sensor 122 and the circuitry of circuit block 124 of FIG. 8 has been implemented as an integrated circuit 116 that is mounted on substrate 126 adjacent to integrated circuit 128 (e.g., a gate driver integrated circuit such as integrated circuit 110, a display driver integrated circuit such as circuit 108, or other display control integrated circuit). Substrate 126 may be a printed circuit such as one of flexible printed circuits 120 of FIG. 7 or a display layer substrate such as display layer 58 (e.g., a thin-film-transistor layer). If desired, integrated circuit 116 and integrated circuit 128 may be mounted on separate substrates.

Figure 10:
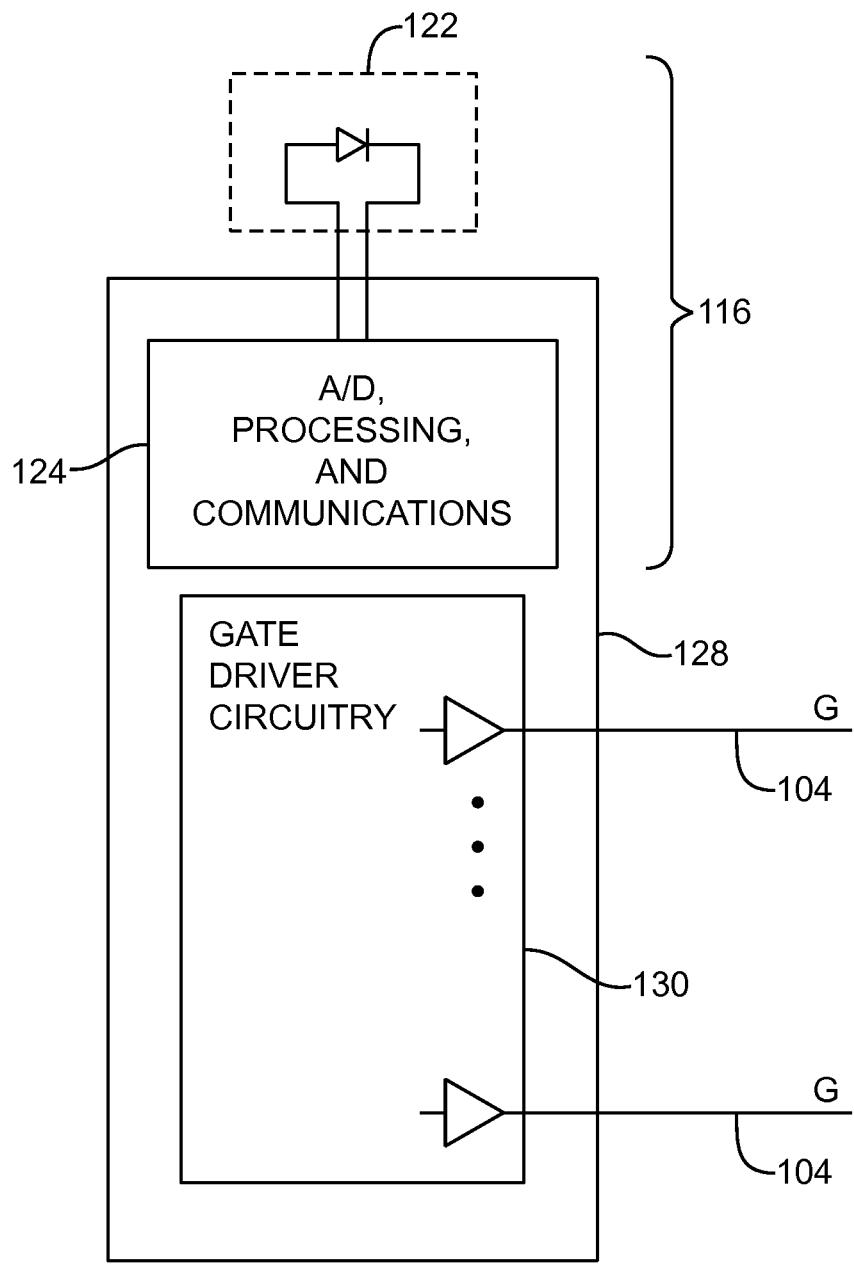
FIG. 10 is a circuit diagram of a display control integrated circuit such as a gate driver integrated circuit that includes processing circuitry for processing temperature data from an associated temperature sensor in accordance with an embodiment of the present invention.

As shown in FIG. 10, temperature sensor 122 (e.g., a temperature sensing diode) may be implemented as part of a different device than the circuitry of block 124. As an example, temperature sensor 122 may be implemented as a thin-film device on a substrate such as thin-film-transistor layer substrate 58, whereas circuit block 124 may be implemented as part of integrated circuit 128 (e.g., an integrated circuit mounted on a substrate such as substrate 62, 120, or 58). Integrated circuit 128 may include display control circuitry 130 such as gate driver circuitry for driving gate signals G onto gate lines 104 or control circuitry associated with display control circuitry 108 (as examples).

Figure 11:
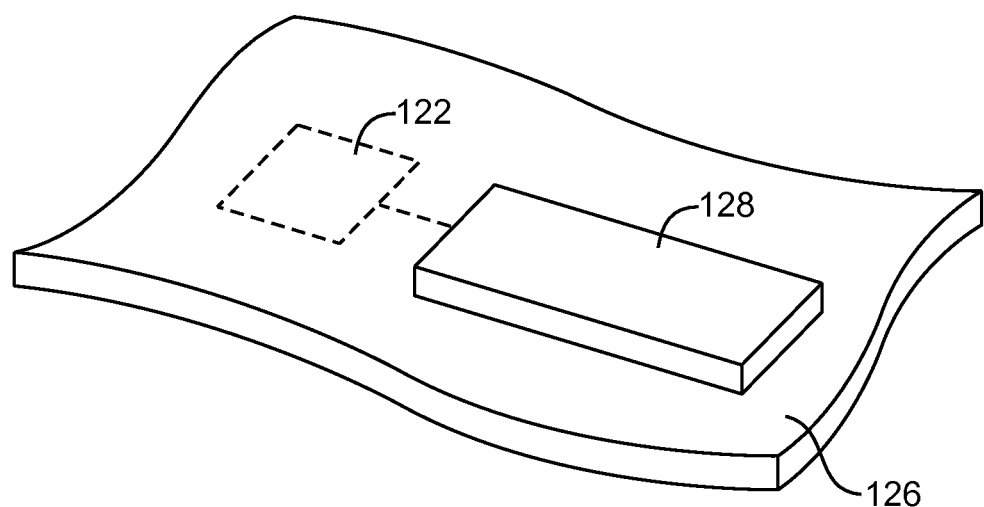
FIG. 11 is a perspective view of a display control integrated circuit such as a gate driver integrated circuit mounted on a substrate and temperature sensor circuitry formed on the substrate in accordance with an embodiment of the present invention.

FIG. 11 is a perspective view of a temperature sensor such as temperature sensor 122 of FIG. 10 and an integrated circuit such as integrated circuit 128 of FIG. 10 mounted on a common substrate such as substrate 126 (e.g., a substrate such as substrate 62, a substrate such as one of substrates 120, or a substrate such as substrate 58). If desired, temperature sensor 122 and integrated circuit 128 may be mounted on separate substrates.

Figure 12:
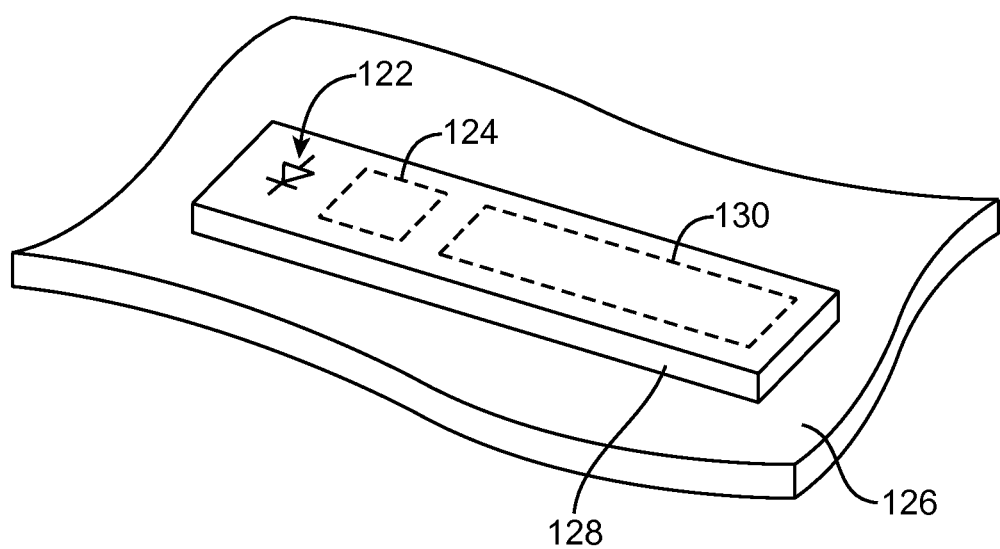
FIG. 12 is a perspective view of a display control integrated circuit such as a gate driver integrated circuit of the type that may include temperature sensor components and associated temperature sensor data processing circuitry in accordance with an embodiment of the present invention.

In the illustrative configuration of FIG. 12, a single integrated circuit (integrated circuit 128) has been used to implement temperature sensor 122, circuit block 124, and display control circuitry 130 (e.g., gate driver circuitry or data line driver circuitry). Integrated circuit 128 may be mounted on substrate 126 (e.g., a substrate such as substrate 62, a substrate such as one of substrates 120, or a substrate such as substrate 58).

Figure 13:
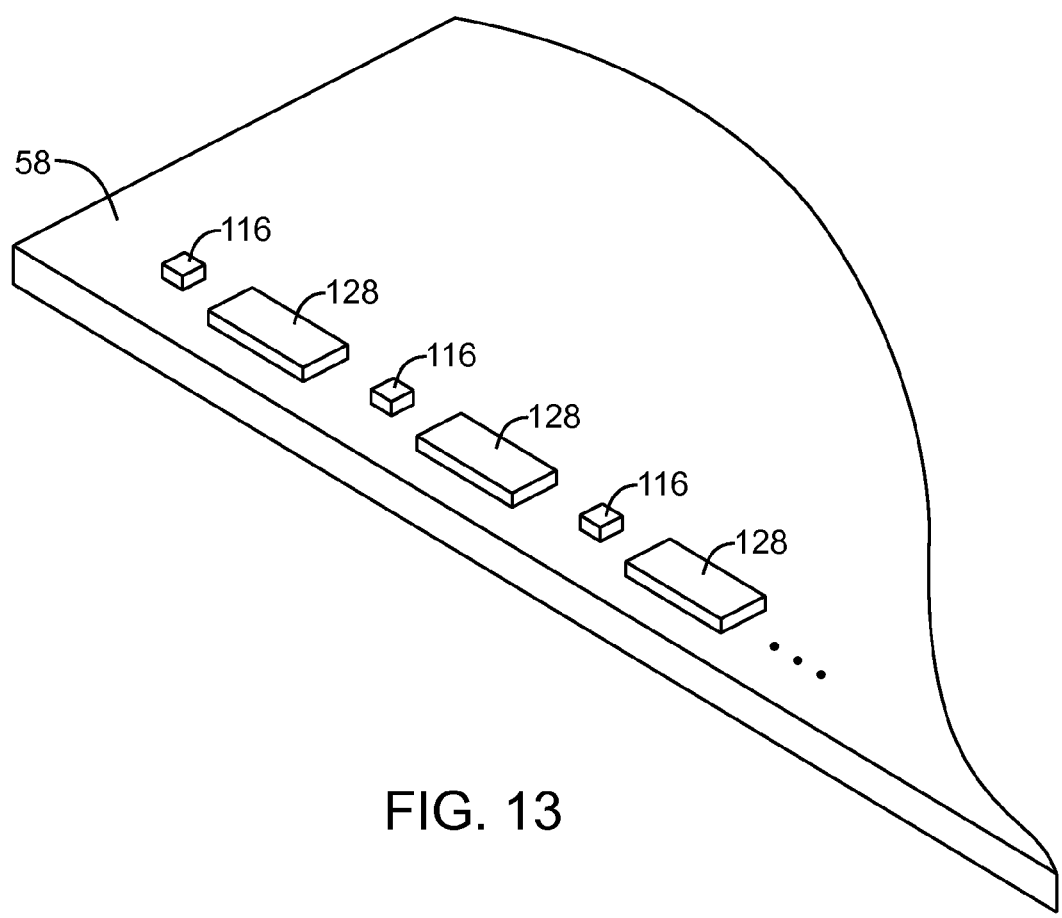
FIG. 13 is a perspective view of an edge portion of a display substrate having integrated circuits such as gate driver integrated circuits or other display control integrated circuits and temperature sensor integrated circuits in accordance with an embodiment of the present invention.

As shown in the perspective view of FIG. 13, a display layer substrate such as thin-film-transistor substrate 58 may be used as substrate 126. In the example of FIG. 13, temperature sensor integrated circuits 116 have been mounted adjacent to integrated circuits 128. Integrated circuits 128 may be gate driver integrated circuits such as gate driver integrated circuits 110 of FIG. 7 or data line driver (source driver) integrated circuits such as circuit 108 of FIG. 7.

Figure 14:
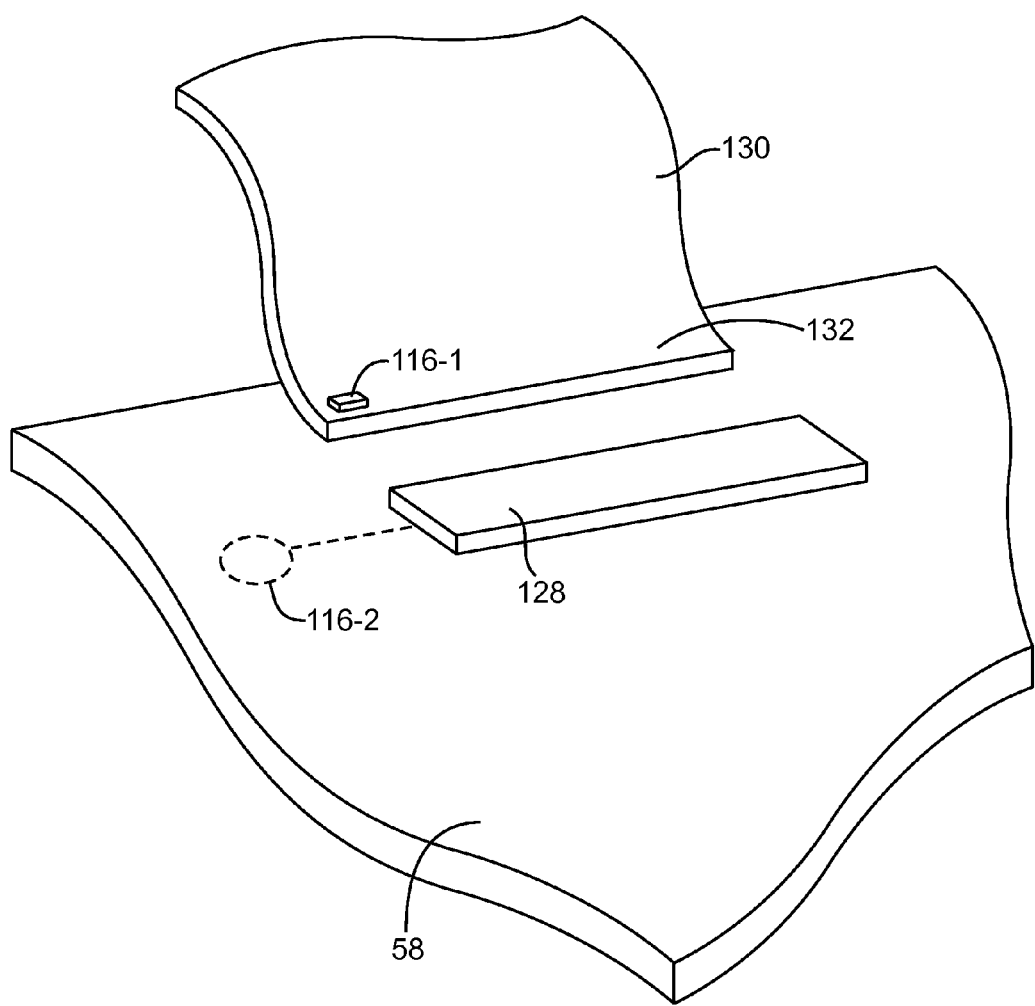
FIG. 14 is a perspective view of a portion of a display substrate to which a flexible printed circuit cable has been attached showing how a temperature sensor may be mounted on the flexible printed circuit cable or on the substrate in accordance with an embodiment of the present invention.

As shown in FIG. 14, temperature sensor circuitry 116 may be mounted on flexible printed circuit substrate 130 (as shown by temperature sensor circuitry 116-1) or on substrate 58 (as shown by temperature sensor circuitry 116-2). Circuits 116-1 and 116-2 may be implemented as integrated circuits, as thin-film devices, as discrete surface mount technology (SMT) parts, etc. Integrated circuit 128 may be a display control circuit such as one of gate driver integrated circuits 110 of FIG. 7 or a date line driver integrated circuit such as circuit 108 of FIG. 7. If desired, integrated circuit 128 may be mounted on portion 132 of substrate 130 while circuit 116-1 is mounted adjacent to region 132 and/or circuit 116-2 is mounted on substrate 58.

Figure 15:
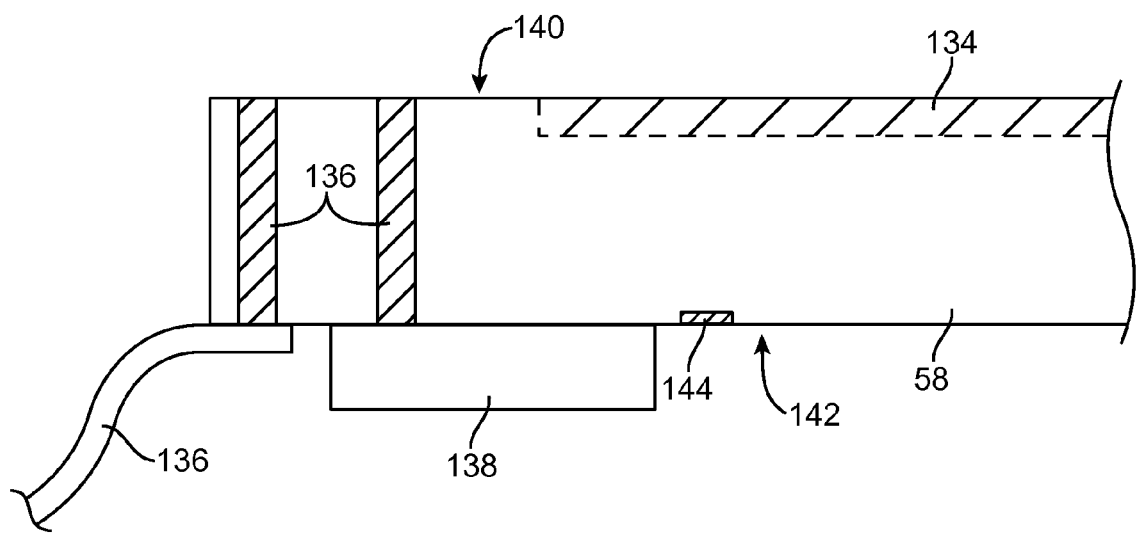
FIG. 15 is a cross-sectional side view of an illustrative display substrate showing how components such as a flexible printed circuit cable and integrated circuits of the type that may include temperature sensor circuitry and temperature sensor data processing circuitry may be mounted on the inactive side of the display substrate and coupled to the active side of the substrate using vias in accordance with an embodiment of the present invention.

If desired, components such as temperature sensing circuitry 116 and/or display control circuitry such as circuitry 108 and 110 may be mounted on the lower surface of display substrate 58. This type of configuration is shown in FIG. 15. As shown in FIG. 15, thin-film-transistor substrate 58 has opposing upper and lower surfaces such as upper surface 140 and lower surface 142. Thin-film-transistor circuitry 134 may include transistors such as transistors 106 of FIG. 6. Circuitry such as one or more integrated circuits 138, thin-film-transistor circuitry 144, and flexible printed circuit substrate 136 may be formed on lower surface 142 of substrate 58. Vias such as vias 136 (e.g., vertical holes that are partially or fully filled with a conductive material such as metal) may be used in routing signals between the circuitry on upper surface 140 and circuitry on lower surface 142. With this type of configuration, circuitry such as temperature sensors 122, circuit blocks 124, temperature sensor integrated circuits 116, circuits 110 and 108, and/or other circuitry may be formed on lower surface 142 and/or on upper surface 140.

Figure 16:
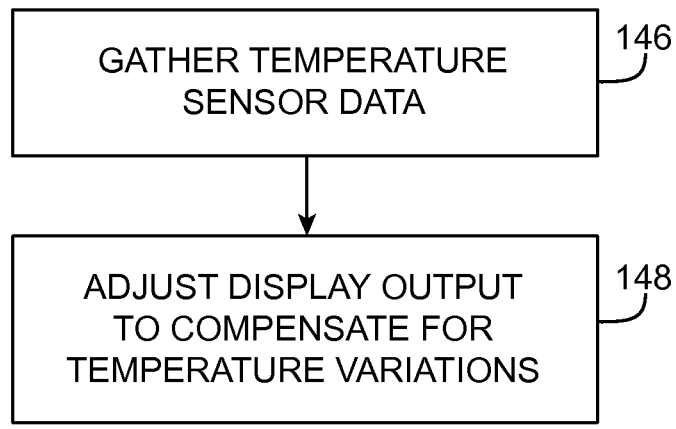
FIG. 16 is a flow chart of illustrative steps involved in using temperature sensor circuitry arrayed around the periphery of a display substrate to compensate a display for temperature-induced color variations in accordance with an embodiment of the present invention.

Illustrative steps involved in gathering and using temperature data using temperature sensors such as temperature sensors 122 are shown in FIG. 16.

At step 146, control circuitry 29 of device 10 may gather temperature data from temperature sensors 122. Temperature sensors 122 may be formed as thin-film devices on a substrate such as substrate 58 or other substrate layers, may be formed as part of an integrated circuit mounted on a substrate such as one of substrates 120, substrate 62, or substrate 58 (as examples) or may otherwise be incorporated into display 14 at a location that allows temperature sensors 122 to be exposed to the same temperatures as display pixels 106 of display 14. Temperature sensors 122 may communicate with control circuitry 29 using communications circuitry in circuits 124. By gathering temperature data from temperature sensors 122, control circuitry 29 may ascertain the temperature of substrate 58 and display pixels 106 at various locations across display 14. As an example, if there are five temperature sensors running along the left edge of display substrate 58 and five temperature sensors running along the right edge of display substrate 58, control circuitry 29 can make temperature measurements corresponding to ten separate regions of display 14. By evaluating the temperatures of each of the ten regions (in this example), control circuitry 29 can identify hotspots within display 14 and can take corrective action.

After gathering temperature information from temperature sensors 122, control circuitry 29 may, at step 148, make compensating adjustments to the display data that is being displayed on display 14. For example, in response to determining from the temperature measurements of step 146 that one of ten regions in display 14 is particularly hot and is therefore expected to have a particularly blue color cast, control circuitry 29 can adjust the color of the content that is associated with that region by providing that content with an opposing color cast, so that the resulting content that is displayed on display 14 has satisfactorily uniform and accurate colors. The operations of steps 146 and 148 may be performed continuously to accommodate temperature changes associated with events such as powering up device 10, adjusting the brightness of display 14, turning on and off resources in device 10 in a way that affects internal component temperatures and therefore the temperature of portions of display 14, and other operations in device 10 that affect display temperature.

The foregoing is merely illustrative of the principles of this invention and various modifications can be made by those skilled in the art without departing from the scope and spirit of the invention.

What is claimed is:

1. A display, comprising:
   a display layer substrate having a rectangular periphery with edges;
   an array of display pixels on the substrate;
   at least one temperature sensor;
   at least one additional substrate, wherein the at least one temperature sensor is mounted on the at least one additional substrate; and
   a signal path that is formed from metal traces on the display layer substrate and on the at least one additional substrate.

2. The display defined in claim 1 wherein the at least one temperature sensor comprises a plurality of temperature sensors running along the given one of the edges.

3. The display defined in claim 2 wherein the signal path is coupled to the plurality of temperature sensors.

4. The display defined in claim 3 wherein the at least one additional substrate comprises a plurality of flexible printed circuit substrates each of which is coupled to the display layer substrate along the given one of the edges and wherein each of the plurality of temperature sensors is mounted on a respective one of the flexible printed circuit substrates.

5. The display defined in claim 4 further comprising a plurality of display control integrated circuits each of which is mounted on a respective one of the flexible printed circuit substrates.

6. The display defined in claim 5 further comprising a flexible printed circuit cable coupled to the display substrate layer, wherein part of the signal path includes metal traces on the flexible printed circuit cable.

7. The display defined in claim 6 further comprising a data line driver integrated circuit on the flexible printed circuit cable.

8. The display defined in claim 7 wherein the display layer substrate comprises a thin-film-transistor layer substrate.

9. The display defined in claim 1 further comprising a plurality of integrated circuits, wherein the at least one temperature sensor comprises a plurality of temperature sensors, and wherein each of the plurality of integrated circuits includes one of the temperature sensors.

10. The display defined in claim 9 further comprising gate lines and data lines that provide control signals to the array of display pixels, wherein each of the integrated circuits includes gate line driver circuitry coupled to the gate lines.

11. The display defined in claim 9 wherein each of the integrated circuits includes analog-to-digital converter circuitry that digitizes temperature signals from the temperature sensors and includes communications circuitry.

12. The display defined in claim 11 wherein the communications circuitry is configured to communicate over a two-wire communications bus.

13. The display defined in claim 1 wherein the display substrate layer has an upper surface on which the display pixels are formed, has an opposing lower surface on which at least one additional temperature sensor is mounted, and has vias through the display substrate layer.

14. The display defined in claim 1 wherein the edges include a left edge and a right edge and wherein the at least one temperature sensor includes a first set of temperature sensors that are mounted along the left edge and a second set of temperature sensors that are mounted along the right edge.

15. An electronic device, comprising:
   a liquid crystal display having a thin-film-transistor layer and a plurality of temperature sensors that are mounted along at least one edge of the thin-film-transistor layer; and
   control circuitry that is configured to gather temperature sensor data from the temperature sensors to compensate the liquid crystal display for color casts due to temperature fluctuations in the thin-film-transistor layer, wherein the at least one edge of the thin-film-transistor layer comprises a left edge, wherein the thin-film transistor layer has an opposing right edge, and wherein the liquid crystal display further comprises:
      a plurality of flexible printed circuit substrates coupled to the left and right edges of the thin-film-transistor layer, wherein the temperature sensors are mounted on the plurality of flexible printed circuit substrates.

16. The electronic device defined in claim 15 wherein the thin-film transistor layer includes thin-film transistors that are coupled to gate lines and data lines, the liquid crystal display further comprising a plurality of gate driver integrated circuits coupled to the gate lines, wherein each of the plurality of gate driver integrated circuits is mounted on a respective one of the flexible printed circuit substrates.

17. The electronic device defined in claim 15 wherein the liquid crystal display comprises a plurality of gate driver integrated circuits coupled to gate lines in the liquid crystal display and wherein each of the temperature sensors is associated with a respective one of the gate driver integrated circuits.

18. A display, comprising:
   a thin-film-transistor substrate layer having an array of display pixels controlled by control signals provided over gate lines and data lines, wherein the thin-film-transistor substrate layer has peripheral edges; and
   a plurality of temperature sensor integrated circuits mounted on the thin-film-transistor substrate layer, wherein the plurality of temperature sensor integrated circuits is configured to measure temperatures along at least some of the peripheral edges.

19. The display defined in claim 18 further comprising a plurality of integrated circuits coupled to at least some of the gate lines and data lines, wherein the temperature sensor integrated circuits are formed as part of the integrated circuits.

20. The display defined in claim 18 further comprising:
   a plurality of display control integrated circuits coupled to at least some of the gate lines and data lines, wherein the temperature sensor integrated circuits are each coupled to a respective one of the plurality of display control integrated circuits.

21. The display defined in claim 18 further comprising a signal bus to which each of the plurality of temperature sensor integrated circuits is coupled.

* * * * *